No. 12,732. REISSUED DEC. 17, 1907.
H. G. JOHNSTON.
HYDRAULIC SWIVEL.
APPLICATION FILED JUNE 12, 1905.
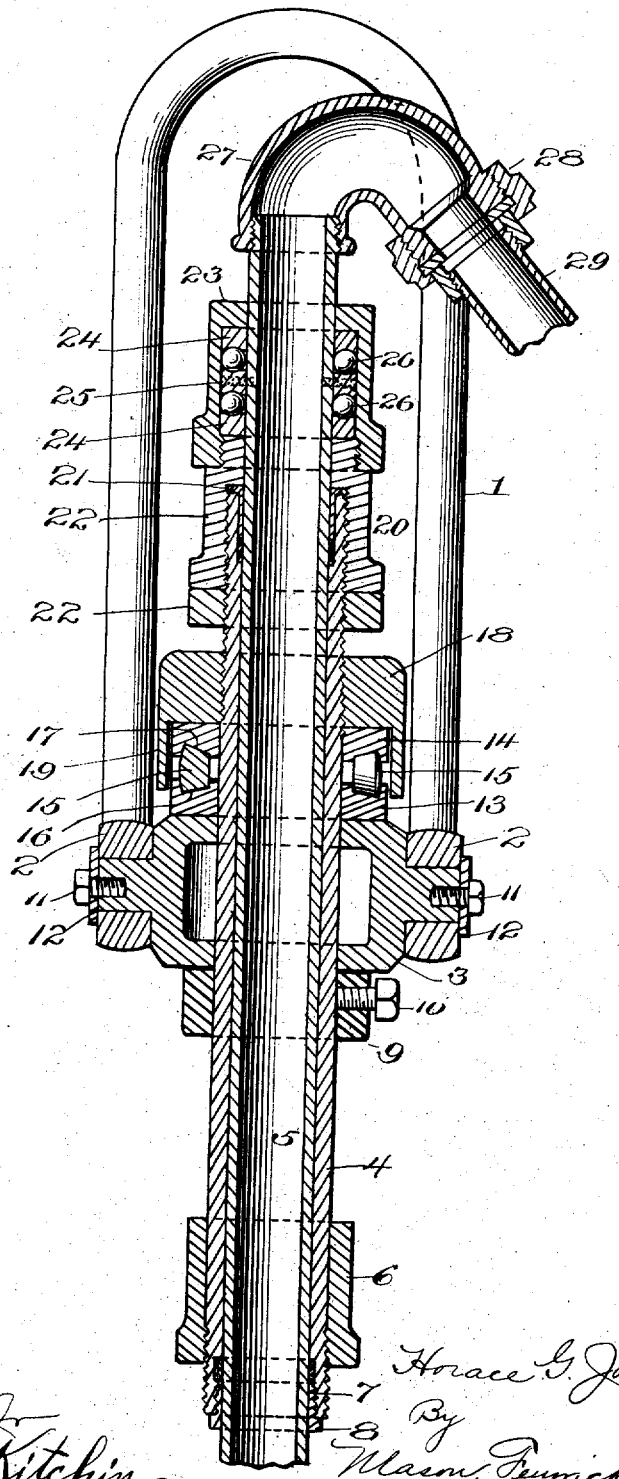
Witnesses
J. M. Fowler Jr.
Edgar M. Kitchin
Inventor
Horace G. Johnston,
By
Mann, Peinick & Lawrence,
Attorneys

UNITED STATES PATENT OFFICE.

HORACE G. JOHNSTON, OF CORSICANA, TEXAS, ASSIGNOR OF ONE-HALF TO WILLIAM P. STURM AND JACOB W. STURM, OF CORSICANA, TEXAS.

HYDRAULIC SWIVEL.

No. 12,732. Specification of Reissued Letters Patent. Reissued Dec. 17, 1907.

Original No. 742,667, dated October 27, 1903, Serial No. 153,650. Application for reissue filed June 12, 1905. Serial No. 264,964.

*To all whom it may concern:*

Be it known that I, HORACE G. JOHNSTON, a citizen of the United States, residing at Corsicana, in the county of Navarro and State of Texas, have invented certain new and useful Improvements in Hydraulic Swivels; and I do hereby declare the following to be a full, clear, and exact description of the invention, such as will enable others skilled in the art to which it appertains to make and use the same.

This invention relates to improvements in hydraulic swivels; and the object in view is the production of mechanism for supporting a supply-hose in a given position while delivering the water to a rotating drill-tube, the hose being retained against movement.

With this and other objects in view the invention consists of a swivel-block, supporting means therefor, a swivel-stem extending through said block, a hose-stem within said swivel-stem, and means carried by the hose-stem rotatably supporting the swivel-stem.

It further consists in certain other novel constructions, combination, and arrangement of parts, as will be hereinafter fully described and claimed.

In the accompanying drawing, the figure represents a longitudinal, vertical, central section through a hydraulic swivel embodying the features of the present invention.

In the well-boring art, it is necessary to supply water to the cutting end of the well-boring tube and to rotate said tube while being supplied with water. As disclosed in the accompanying drawing, I contemplate providing a swivel for supporting the water-supply pipe in a stationary condition while delivering water to the rotating tube.

Referring to the drawing by numerals, 1 indicates a bail or clevis of any preferred form apertured at its ends, as at 2 2, and finding bearings on the projecting reduced ends of the hollow supporting or trunnion-block 3, which block revolubly surrounds the swivel-stem 4 and is provided at its ends with locking-bolts 11 and washers 12 for preventing lateral play of the ends 2 of bail 1. The trunnion-block 3 obviously may be supported by a bail otherwise connected than as illustrated. The trunnion-block 3, as suggested is hollow and is formed with an interior annular chamber, which produces a comparatively light and at the same time strong structure.

The swivel-stem 4 surrounds the hose-stem 5 and in operation revolves about the same. The lower end of the swivel-stem 4 is exteriorly threaded, and a bushing 6 is threaded upon the same for forming a close joint with the pipe-section to be connected to the lower end of said swivel-stem and for obviating danger of said stem shaking loose and unscrewing. In order to provide a close joint between swivel-stem 4 and hose-stem 5, the inner surface of the stem 4 is cut away, forming a stuffing-box 7, which box is preferably filled with hemp or other suitable packing material. A gland 8 is threaded into the lower end of said stem 4 for closing said stuffing-box 7 and retaining the packing in position. A collar 9 surrounds the stem 4 just below the trunnion block 3 and is adjustable vertically with respect to the stem 4, a set screw 10 being passed through the collar into engagement with the swivel stem 4 for sustaining the collar 9 in any adjusted position on stem 4, so that said collar 9 may be adjusted vertically upwardly on the swivel stem for taking up wear between the bearings 15 and collars 13 and 14, the collar 9 obviously by downward vertical movement permitting the collars 13 and 14 to be moved apart, and access to be had to the bearings 15 for renewal and repair of the parts and dismantling and assembling of the parts when desired. Mounted above and resting upon said trunnion-block 3, is an annular collar 13, the space between said collars being maintained by means of cones 15 or other suitable antifriction devices traveling within annular raceways 16 and 17, formed in the said collars for limiting the lateral play of said cones, or other antifriction means.

The upper end of swivel-stem is externally screw-threaded, and a nut 18, formed with an annular housing 19, is threaded thereon and screwed down upon collar 14, with the housing 19 inclosing both collars 13 and 14 for retaining the same against vertical movement or other dislocation. The inner surface of the upper end of stem 4 is preferably cut away for a short distance, forming an annular stuffing-box 20, designed to be filled with any preferred packing, and a gland 21 closes the upper end of said box for retaining the packing in position. Threaded upon the upper end of the swivel-stem 4 is a cap 22, which is provided with an inner annular shoulder resting upon the flange of gland 21, whereby a tight closure is made between the upper end of the swivel-stem 4 and the hose-stem 5, a lock nut 22′ being assigned to prevent displacement of cap 22.

A superimposed annular cap 23 is threaded upon the upper end of the cap 22 and forms an annular housing about said stem 5, closed at the upper end by an annular shoulder formed integral with said bushing 23. This annular housing is filled by upper and lower collars 24, 24, secured to said cap 23, each provided with an annular raceway or groove for the reception of bearings, as will be hereinafter mentioned. A central collar 25 is fixed to stem 5 between collars 24—24 and is provided on both its edges with bearing-receiving grooves similar to those in collars 24—24, said collar 25 being spaced from the collars 24—24 by ball or other antifriction bearings 26—26, interposed between said collars and riding in said annular grooves or raceways.

A gooseneck 27 is threaded onto the upper end of the hose-stem 5 and carries a suitable union or coupling 28, adapted to receive any preferred form of supply pipe or hose 29.

In operation the bail 1, being supported by any preferred tackle carried by a suitable derrick, supports the elements carried by the trunnion-block, and the parts are brought into line with the section of the well-boring tube, and the lower end of the swivel-stem 4 is connected to the section of water-supply pipe of the well-boring mechanism, and the said section of supply-pipe, together with the improved swivel, is raised to a vertical position and connected with the pipe already in the well. The water may now be forced through the hose connection 28, and it will find its way down through the hose-stem 5 and into the supply-pipe, from which it passes out under the cutting edge of said pipe, the said supply pipe or tube being given a rotary motion by any of the well-known means, said supply-pipe and rotating means not being shown. During operation the swivel-stem 4, collar 14, nut 18, caps 22 and 23, with collars 24 24, and the bushing 6 will revolve with the pipe, to which the parts are connected. The collar 13, bail 1, trunnion-block 3, and hose-stem 5 and its hose connections will remain stationary. It will be apparent that the water will be prevented from passing between swivel-stem 4 and hose-stem 5 by means of the packing within the stuffing-boxes 7 and 20.

Having thus fully described my invention, what I claim as new, and desire to secure by Letters Patent, is—

1. In a hydraulic swivel, the combination with a trunnion-block and a bail supporting the same, of a swivel-stem extending through said block, a hose-stem within said swivel-stem, a collar surrounding said swivel-stem above said block, a similar collar spaced above the first-mentioned collar, antifriction means interposed between said collar and a housing carried by said swivel-stem inclosing said collars.

2. In a hydraulic swivel, the combination with a suitable support, of a swivel-stem, a collar surrounding the same, a collar carried by said stem, antifriction bearings interposed between said collars, a nut threaded on said swivel-stem above the uppermost collar, and a housing depending from said nut inclosing said antifriction means.

3. In a hydraulic swivel, the combination with a suitable support, of a swivel-stem, a collar surrounding the same and rotatably mounted upon said support, an annular depending housing carried by said swivel-stem inclosing said collar, and a hose-stem rotatably mounted independently of said swivel-stem.

4. A hydraulic swivel, comprising a trunnion block, means for lifting the same swiveled thereto, a swivel stem passed through said trunnion block, a hose stem within the same, means for supporting said trunnion block, adjustable vertically with relation to said swivel stem, an annular collar surrounding said swivel stem above said trunnion block, a similar collar above the same, antifriction means interposed between said collars, and means for retaining said collars and antifriction means in position.

5. A hydraulic swivel, comprising a swivel-stem, a hose-stem, within the swivel-stem, means for revolubly supporting the swivel-stem, a bushing threaded upon the upper end of said swivel-stem, closing the upper end thereof, the said upper end of the swivel-stem being formed with an inner, annular space forming a stuffing-box between the said stem and the hose-stem, means for closing said stuffing-box, and means at the lower end of said swivel-stem for preventing water from entering between said swivel and hose stems.

6. A hydraulic swivel, comprising a supporting block, a swivel stem, a hose stem discharging into said swivel stem, means adjustable with respect to the swivel stem for sustaining the supporting block, and means sustained by the supporting block for rotatably supporting the swivel stem.

7. A hydraulic swivel, comprising a supporting block, a swivel-stem passed through said supporting block, a hose-stem discharged into the same, means adjustably engaging said swivel-stem for sustaining said supporting block in position, a support connected with said swivel-stem above said supporting block, and bearings interposed between said supporting block and the support connected to the swivel-stem.

8. A hydraulic swivel, comprising a supporting block, a swivel-stem passed through said supporting block, a hose-stem discharging into the swivel-stem, a collar fixed to the swivel-stem above said supporting block and designed to sustain the swivel-stem upon said supporting block while permitting the same to rotate independently of the supporting block, and means adjustably engaging said swivel-stem beneath said supporting block for sustaining the same in position whereby the said supporting block may be adjusted on the swivel-stem.

9. A hydraulic swivel, comprising a supporting block, a swivel-stem passed through said supporting block, a supporting device engaging said swivel-stem above said block, bearings interposed between said supporting device and said block, a collar surrounding said swivel-stem beneath said block, and means for securing said collar in position at various points of adjustment longitudinally of the swivel-stem.

10. A hydraulic swivel, comprising a supporting block, a swivel stem extending through and sustained by said block, a collar surrounding said stem adjustable longitudinally thereof and adapted to engage said block for sustaining the same in position, and means for securing said collar in position on the stem.

11. A hydraulic swivel, comprising a block, a swivel stem rotatably connected to said block, a hose stem discharging into the swivel stem, adjustable means connected with the swivel stem for at times supporting said block, and means for sustaining the block in position for supporting the swivel stem and permitting rotation thereof.

In testimony whereof, I hereunto affix my signature in the presence of two witnesses this 9th day of June, 1905.

HORACE G. JOHNSTON.

Witnesses:
H. E. TRAYLOR,
EDWARD T. FENWICK.